United States Patent [19]

Ray

[11] Patent Number: 5,053,364

[45] Date of Patent: Oct. 1, 1991

[54] ALUMINUM BORATE CERAMIC MATRIX COMPOSITE

[75] Inventor: Siba P. Ray, Plum Boro, Pa.

[73] Assignee: Aluminum Company of America, Pittsburgh, Pa.

[21] Appl. No.: 364,132

[22] Filed: Jun. 12, 1989

[51] Int. Cl.$^5$ ............... C04B 35/10; C04B 35/52; C04B 35/56

[52] U.S. Cl. ............... 501/95; 501/88; 501/89; 501/96; 501/98; 501/127; 501/128

[58] Field of Search ............... 501/87, 88, 89, 95, 501/96, 98, 127, 128; 264/65

[56] References Cited

U.S. PATENT DOCUMENTS

| | | | |
|---|---|---|---|
| 3,795,524 | 3/1974 | Sowman | 106/65 |
| 4,540,475 | 9/1985 | DeAngelis | 204/67 |
| 4,698,319 | 10/1987 | Ray | 501/87 |
| 4,774,210 | 9/1988 | Ray | 501/127 |
| 4,804,642 | 2/1989 | Ray | 501/87 |
| 4,804,646 | 2/1989 | Ray | 501/105 |

OTHER PUBLICATIONS

Holtz et al., "High Temperature Properties of Three Nextel Ceramic Fibers", 32nd Int'l SAMPE Symposium, Apr. 6–9, 1987, pp. 245–256.

Baumann et al, "Electric Furnace Boroaluminate", J. Amer. Ceramic Soc., Oct. 1, 1942, vol. 25, No. 14, pp. 391–394.

*Primary Examiner*—William R. Dixon, Jr.
*Assistant Examiner*—Anthony J. Green
*Attorney, Agent, or Firm*—Andrew Alexander

[57] ABSTRACT

Disclosed is a high strength aluminum borate ceramic matrix composite product and a method of making the same which comprises providing a slurry of aluminum oxide, boron oxide and organic or aqueous binder, the aluminum oxide and boron oxide capable of reacting to form aluminum borate. The slurry is introduced to a body, e.g., web of ceramic fibers, to provide an infiltrated web. After removing liquid and organic binder from the infiltrated web, it is sintered to react the aluminum oxide and boron oxide to form a ceramic matrix composite comprised of aluminum borate and said web of ceramic fibers. The reaction causes a volume expansion which aids in filling or removal of pores or voids resulting from the removal of organic binder.

23 Claims, 1 Drawing Sheet

ALUMINUM BORATE CERAMIC MATRIX COMPOSITE

INTRODUCTION

This invention relates to ceramic composites and more particularly, it relates to ceramic matrix composites.

The need for advanced materials in high performance engineering systems has prompted consideration of ceramics, which offer many advantages over metals and alloys. Ceramics provide high temperature capability, environmental stability and low density. However, the use of ceramics is severely limited because of their extreme sensitivity to flaws and brittle character. With the availability of continuous ceramic fibers, there has been a tremendous interest in the development of ceramic matrix composite (CMC) possessing high temperature capability (T > 1500° F.), noncatastrophic failure mechanisms and low density. For CMC to function well, the matrix, fibers and the interface have to be compatible. Also, for economic and practical reasons, the processing route should preferably be simple, inexpensive and capable of manufacturing large and complex shapes.

Ceramic matrix composed of lightweight ceramic materials formed from aluminum oxide mixed with phases of other metal oxides are desirable from the standpoint of weight as well as chemical inertness. U.S. Pat. No. 4,698,319 describes a ceramic which comprises an interwoven mixture of $TiB_2$ and $Al_2O_3$ formed by reacting together a mixture of $TiO_2$, $B_2O_3$ and aluminum metal. This ceramic material has been found to possess excellent chemical inertness properties even at elevated temperatures.

However, such ceramic materials or cermets are not necessarily characterized by light weight nor do they always possess high strength qualities, particularly if they have been blended to optimize other properties such as chemical inertness and electrical conductivity. Further, monolithic ceramics can have very high strength and elastic moduli, but they tend to be brittle.

The formulation of ceramic materials from oxides of aluminum and boron would be expected to be somewhat lighter than aluminum oxide, depending upon the amount of boron oxide used, because the density of aluminum oxide is about 3.9 and the density of boron oxide is about 2.46. Ceramics made from such oxides are known.

Sowman U.S. Pat. No. 3,795,524 describes the formation of transparent extrusions such as fibers of aluminum borate and aluminum borosilicate materials from an aqueous solution or dispersion, e.g., an aqueous solution of a boric acid-stabilized aluminum acetate, which is concentrated into extrudable gels, subsequently dried, and then fired at temperatures up to 1000° C. to form fibers of transparent aluminum borate or aluminum borosilicate. The patentee states that low density aluminum borate fibers may be formed in this manner having an $Al_2O_3:B_2O_3$ mole ratio of from 9:2 to 3:1.5. Sowman, however, cautions against firing at temperatures as high as 1200° C., stating that fibers fired at this temperature are weak and fragile.

DeAngelis U.S. Pat. No. 4,540,475 discloses the formation of a multiple phase body containing phases of $TiB_2$, $Al_2O_3$ and $9Al_2O_3 2B_2O_3$. The body was formed from a dry mixture of $AlB_2$, $TiO_2$ and $Al_2O_3$ which was pressed at 1500 psi and then fired at 1500° C.

Baumann and Moore in an article entitled "Electric Furnace Boroaluminate" in *The Journal of the American Ceramic Society*, Oct. 1, 1942, Vol. 25, No. 14, disclose that boroaluminate has been produced as a crystalline material by electric furnace fusion. The crystal form is orthorhombic, and it appears to melt incongruently and is analogous in several ways to mullite.

Ray U.S. Pat. No. 4,774,210 discloses a sintering aid suitable for use in forming aluminum borate into a ceramic product, the sintering aid comprised of an aluminum borate compound having a melting point lower than the sintering temperature of aluminum borate.

Ray U.S. Pat. No. 4,804,642 discloses an aluminum borate base ceramic composite comprised of a metal compound and a composition having the formula $Al_yB_xO_z$.

Ray U.S. Pat. No. 4,804,646 discloses a high strength low density opaque shaped aluminum borate product characterized by an MOR of at least 45,000 psi and a density of approximately 2.9 g/cm³. The shaped aluminum borate may be formed by reacting an aluminum oxide with a boron oxide at a temperature of at least 800° C., grinding the reaction product, pressing the resulting particulate into a shaped form and sintering the shaped particulate at a temperature of from 800° to 1400° C. while maintaining the shaped article under a pressure of 2500 to 3500 psi.

U.S. Pat. No. 4,774,210 discloses that a lightweight aluminum borate material can be fabricated without pressure during sintering.

One of the problems in forming ceramic matrix composites is obtaining a highly densified product. That is, whenever an organic binder is burned out of the ceramic matrix composite, porosity results. Different approaches are used to fill the porosity to increase the density of the composite. One approach is chemical vapor infiltration. However, during chemical vapor infiltration, material deposits on the surface of the composite, and holes or pores are closed, preventing further densification. Thus, it can be seen that there is a great need for a system which can substantially eliminate the porosity. The present invention solves this problem by providing a system wherein the formation of ceramic during sintering has a volume expansion which is effective in reducing or eliminating porosity.

SUMMARY OF THE INVENTION

It is an object of this invention to provide a high strength aluminum borate matrix composite product.

It is another object of this invention to provide a ceramic matrix composite which effectively reduces porosity during sintering.

It is yet another object of this invention to provide a high strength aluminum borate matrix composite product formed by reacting together a mixture of an aluminum oxide and a boron oxide in the presence of a reinforcing ceramic fiber, for example.

In accordance with these objects there is provided a high strength aluminum borate ceramic matrix composite product and a method of making the same which comprises providing a slurry of aluminum oxide, boron oxide and organic binder, the aluminum oxide and boron oxide being provided in proportions capable of reacting to form aluminum borate. The slurry is introduced to a web or webs of ceramic fibers to provide an infiltrated web. After removing liquid and organic binder from the infiltrated web, the green composite is sintered to react the aluminum oxide and boron oxide to form a ceramic matrix composite comprised of said web of ceramic fibers and aluminum borate. The reaction causes a volume expansion which aids in filling or removal of pores or voids resulting from the removal of organic binder.

DETAILED DESCRIPTION OF THE INVENTION

Figure 1:
FIG. 1 is a micrograph of a fractured ceramic matrix composite in accordance with the invention.

A high strength ceramic matrix composite is formed and is comprised of a web or mat of fibers of silicon carbide, for example, and aluminum borate. The composite is formed by providing a slurry comprised of powders of aluminum oxide and boron oxide provided in an organic or aqueous liquid containing a binder. The amount of solids in the slurry can range from 40 to 70 vol. %. The solids which comprised alumina and boria are preferably in the ratio of 9 to 2 (4.5). However, the ratio of alumina to boria may range from 2 to 8. The slurry is introduced to a web or cloth of suitable ceramic fibers and dispersed throughout the web. Several layers of the infiltrated web may be provided as a body having increased thickness. The body or layers may be squeezed or pressed to remove excess liquid and thereafter dried and heated to burn off organic material. The heated body is sintered so as to cause the aluminum oxide and boron oxide to react in situ to form an aluminum borate matrix thereby forming a ceramic matrix composite of ceramic fibers and said aluminum borate, preferably having a density of at least 90%. Preferably, the molar ratios of $Al_2O_3$ and $B_2O_3$ are controlled to form $Al_{18}B_4O_{33}$ during reaction sintering. In its broader aspects, the aluminum borate may be represented by the formula $Al_xB_yO_z$ wherein x is equal to 16-20, y is equal to 3-5 and z is equal to 30-36.

The aluminum oxide to be mixed with the boron oxide powder may comprise Alcoa A-16 super ground alumina having an average particle size of 0.4 micrometer while the boron oxide may comprise Fisher A-76 $B_2O_3$ powder or boria powder which should also have an average particle size of about $-325$ mesh (Tyler). The powder mixture may then be blended and milled, e.g., ball milled, prior to adding to the binder.

Other aluminum compounds, e.g., $Al_2O_3.3H_2O$, $Al_2O_3.H_2O$, $AlCl_3.6H_2O$, $AlCl_3$, and $Al(NO_3)_3.9H_2O$, may be used along with boric acid, e.g., $H_3BO_3$.

When the body is heated up to 1000° C., the major constituents are $Al_2O_3$ and $2Al_2O_3.B_2O_3$ type phase. On further heating to above 1035° C., there is a major phase change; that is, the major constituent form is $Al_{18}B_4O_{33}$. The material may be further heated to 1300° C. However, this can detrimentally affect the integrity of the fibers in the composite. Calcination of alumina and boria powder at a temperature of above 1035° C. results in the formation of $Al_{18}BO_4O_{33}$.

The monolithic $Al_{18}B_4O_{33}$ material, when sintered to a high density, e.g., 2.92 gm/cc (99% dense), has a thermal expansion coefficient of $4 \times 10^{-6}$ cm/cm°K., and thermal conductivity of 0.065 W/cm/°K. In addition, the material had a MOR strength of 30-35,000 psi and a hardness of 1100-1260 VPN.

When an organic binder is used, the binder solution may contain monomers, plasticizer and a solvent. The solution typically is approximately 15% of the entire slurry, when the powder density is approximately 3-4 g/cm$^3$. This organic binder is described in WO 88/07505, incorporated herein by reference, parts of which are reproduced below for convenience. Using the binder, even though there is a high solids content, the slurry can be made to infiltrate and wet the fibers. Typically, the viscosity ranges from 50 to 50,000 with 50 to 5,000 cps being preferred. However, it is to be understood that the preferred viscosity will depend on the fabrication equipment, the shape of the piece being formed and the fiber web or mat to be infiltrated. It is important that the slurry can flow readily without the need to use high pressure to induce flow or to overcome a yield stress to flow. The present invention can provide slurry viscosities of less than 1000 cps (at 100 s$^{-1}$) at solids loading of at least about 50 vol. %. Such slurries are not only pourable, but are injectable under extremely low, virtually zero pressure (i.e., gauge pressure as opposed to absolute).

The monomers used in the dispersant solution can be any vinyl or acrylic monomer or mixtures thereof, or they may also include oligomers with vinyl (e.g., acrylic) functionalities. They may also be multi-functional or can contain other reactive moieties, such as hydroxyl, epoxy, or urethane groups. In preferred embodiments, the monomer may be chosen from among the acrylates, styrenes, vinyl pyridines, other vinyl compounds, or a mixture of these or their derivatives. After polymerization, these yield polyacrylates, polystyrenes, poly (vinyl pyridines), polyvinyls, or a mixture of these polymers or copolymers or their derivatives. The term "monomer" is used herein to connote both monomers and oligomers, components that are essentially unpolymerized with respect to the final polymerization product.

The monomers may make up about 50 wt. % of the binder solution, or about 7 wt. % to about 10 wt. % of the entire slurry, but higher or lower levels of monomers may be useful depending on the shape of the piece being formed.

The remaining portion of the binder solution (or about 7%-10% by weight of the slurry) is made up of various volatile organic solvents. This additional component of the dispersant solution may contain plasticizers, diluents, and dispersants. Typical plasticizers are dibutylphthalate and other phthalate esters. Examples of diluents include decalin and volatile fatty acids or esters, such as oleic acid. Commonly used dispersants include GAFAC RE-610 (an anionic polyoxyethylene nonylphenyl ether phosphate, available from the GAF Corp., Wayne, N.J.), AEROSOL OT (a dioctyl ester of sodium sulfosuccinic acid, available from American Cyanamid, Danbury, Conn.), organic titanates such as KR TTS or KR-7 (both available from Kenrich Petrochemicals, Inc., Bayonne, N.J.), SPAN 85 (a nonionic sorbitan monolaurate, available from ICI Americas, Wilmington, Del.), or EMCOL CC-55 (a cationic polypropoxy quaternary ammonium acetate, available from Witco Chemical Co., Perth Amboy, N.J.). These are important for a number of reasons. First, they facilitate the ability to achieve a pourable slurry which has a high solids loading by decreasing particle-to-particle interactions (both agglomerative and repulsive). Further, the suspension with the additional organic components can exhibit better isotropic properties in both the green piece and the sintered piece. The particles seem to have a more random orientation, resulting in less internal stress and ultimately fewer defects.

In another embodiment, the in situ polymerization occurs without the need for elevating the temperature above room temperature (approximately 20°–35° C.) although the reaction may occur at elevated temperatures. In one embodiment, two slurries may be mixed. Both slurries may contain ceramic particles, monomers, and organic solvents. One slurry may contain a catalyzable initiator, such as benzoyl peroxide, and the second contains a compound which catalyzes the initiator. Examples of such catalysts can be found in U.S. Pat. Nos. 3,991,008 and 3,591,438. Preferred compounds of this type include dimethyl aniline, dimethyl toluidine, and thioureas. As the two slurries are mixed, the reaction of the catalyst with the initiator triggers in situ polymerization. Alternatively, the catalyst may, of course, be added directly to a slurry containing the initiator. Yet another alternative, depending on the shape produced, is to photoinitiate polymerization.

Types of ceramic fibers which can be used in the matrix include silicon carbide, alumina, alumina-boriasilica, silica, titanium boride, boron, carbon, aluminum silicate and aluminum nitride.

Silicon carbide fibers in the form of a web which has been found to quite suitable are available from Dow Corning, Midland, Mich., under the name Nicalon. Also, a web of alumina-boria-silica fibers has been found to be suitable and is available from 3M Corporation, St. Paul, Minn., under the name Nextel. The fibers may be coated to avoid reaction of the fiber surface with the ceramic constituent during sintering, if desired. It has been found that interlocking of the ceramic and fiber as by reactions may, in certain instances, be detrimental to the performance of the ceramic matrix composite. Thus, for example, the silicon carbide fibers of the Nicalon web may be coated with, for example, boron nitride applied over pyrolytic carbon coated ceramic fiber cloth to prevent or control any reaction that might occur with the fibers during sintering to form the aluminum borate matrix. That is, the coating can maintain a stable interface between the fiber and the matrix. Pyrolytic carbon, BN, TiN and TiC coating may also be useful.

The volume percent of fibers in the sintered body can range from 20 to 60%, preferably 25 to 50% with typical amounts being about 28 to 35%.

After the $Al_2O_3/B_2O_3$ powder slurry has been made, it is introduced to a body of fibers, e.g., web or mat in a manner that lets it permeate through the fibers of the web or bat, sometimes referred to as slurry infiltration. Upon reaching the desired loading of the web with slurry, the infiltrated webs may be layered to provide several webs of fiber throughout the composite body. It will be understood that while reference is made here to flat bodies such as tiles, other configurations, such as pipe shapes or more complex shapes, may be utilized. In the case of pipes, the infiltrated web may be wrapped several times, for example. After the shaping or layering, the body can be pressed or squeezed to remove excess liquid. Thereafter, the body is dried or cured in the range of 40° to 100° C. While curing can occur at room temperature, the curing can have the effect of polymerizing or curing the binder faster and driving off the solvents. The solvent may remain after polymerization and be substantially removed during the binder burnout stage. Burnout can occur at temperature in the range of 300° to 500° F.

It will be appreciated that burnout of the binder can leave voids in the green composite. This can lead to an undesirable low density composite upon sintering. The present invention aids in effectively removing voids from the composite. That is, in reaction sintering, when 9 moles of $Al_2O$ and 2 moles of $B_2O_3$ combine to form $Al_{18}B_4O_{33}$, for example, there is an increase of 14% in volume when all the reactants are converted to $Al_{18}B_4O_{33}$. It will be appreciated that if only half of the reactants are converted, the volume expansion will be about 7%, and any partial reaction is contemplated to be within the purview of the invention. That is, the volume expansion can be 1 to 14 vol. %. Thus, this increase in volume can be used effectively to densify the ceramic matrix composite. Thus, for purposes of the present invention, when it is desired to form $Al_{18}B_4O_{33}$ type compounds, the green composite must be heated sufficiently. For example, when the green composite is heated to above 1035° C., $Al_{18}B_4O_{33}$ is formed. Because aluminum borate expands on forming by sintering, it may be necessary to restrain the green composite in a mold to improve on the removal of the voids.

It may be desired to add sintering aids to the slurry. Such aids include CaO, MgO and $CaAl_2B_2O_7$ which can be in the slurry up to 4 wt. % based on the solid content. Aids for sintering are disclosed in U.S. Pat. No. 4,774,210, incorporated herein by reference.

The ceramic matrix composite has the advantage that contrary to most ceramic bodies, it has a degree of bendability. Further, the composite has a high level of heat resistance, and thus, has utility in exhaust ducts of missles and rockets. Further, because this composite can be made without metal components, it has low observable properties, and therefore, finds utility in aircrafts, missles, etc.

EXAMPLE 1

A powder mixture containing 9 moles of $Al_2O_3$ and 2 moles of $B_2O_3$ and 1% CaO was ball milled with alumina balls. This material was used to make a slurry containing 57 vol. % solids with a liquid containing 42.3 wt. % n-butyl methacrylate, 2.4 wt. % methacrylic acid, 2.4 wt. % diethylene glycol dimethacrylate, 29.4 wt. % dibutyl phthalate, 14.7 wt. % decalin and 8.8 wt. % RE610. To the slurry was added 1 wt. % benzoyl peroxide as initiator. A plain weave Nicalon cloth, heat cleaned to remove sizing, was used for composite layup. Nine layers of 4"×6" Nicalon cloth was used to make a slurry infiltrated composite panel. The slurry was poured onto one layer of cloth placed over aluminum foil. The slurry was spread and allowed to infiltrate the fiber tows of the cloth. Air bubbles were removed by using a steel roller. Another layer of cloth was placed on the first layer and slurry again poured on top of the cloth. This method was repeated for 9 layers. Excess liquid was squeezed out using pressure of 500 psi. At the same time, the part was cured at 65° C. for 1 hour. The binder was burned out in an argon atmosphere starting at 25° C. and ending at 400° C., the temperature being raised over a period of 37½ hours and held at 400° C. for 1 hour. After burnout, the body was sintered at 1080° C. for 2 hours.

The sintered body contained 29.9 vol. % fiber and the matrix was 60% dense when compared to theoretical density of the matrix. The body had a flexure strength of 12,000 psi at room temperature. The tensile strength was 14,000 psi, and room temperature elongation was 0.7% with noncatastrophic failure in this sample.

EXAMPLE 2

In this example, the same procedure was used for infiltration, but 8 harness satin weave Nicalon cloth with duplex CVD coating of BN over pyrolytic carbon on the cloth fibers was used. Approximately 55 vol. % solid was present in the slurry. Sintered part contained 29.4 vol. % fiber, and density of the matrix was 58% of theoretical. The part showed a flexure strength of 28,000 psi after one hour heat treatment at 1500° F. in air. This shows that the part has elevated temperature capability.

Figure 2:
FIG. 2 is a micrograph of a fractured ceramic matrix composite at a higher magnification in accordance with the invention.

FIGS. 1 and 2 show a fracture surface of $Al_{18}B_4O_{33}$-NiCAlON composite as produced in Example 2, and there is shown fiber pullout and noncatastrophic failure.

Having thus described the invention, what is claimed is:

1. A method of forming an improved ceramic matrix composite resulting from formation of aluminum borate from alumina and boria comprising the steps of:
   (a) providing a slurry comprised of aluminum oxide, boron oxide and an organic binder suspended in a liquid, the aluminum oxide and boron oxide being present to form aluminum borate having the formula $Al_xB_yO_z$ where x is in the range of 16 to 20, y is in the range of 3 to 5 and z is in the range of 30 to 36;
   (b) introducing said slurry to a body of ceramic fibers to provide a green composite, the body of ceramic fibers containing at least one of silicon carbide, alumina, alumina-boria-silica, titanium boride, boron, carbon, aluminum silicate and aluminum nitride fibers;
   (c) removing said liquid and said organic binder from said green composite; and
   (d) sintering said green composite at a temperature of greater than 800° C. to cause a reaction of aluminum oxide and boron oxide to form a ceramic matrix composite comprised of said body of ceramic fibers and aluminum borate, the reaction providing a volume expansion which aids in removal of pores resulting from said organic binder removal.

2. The method in accordance with claim 1 wherein the fibers are provided as a web which includes silicon carbide fibers.

3. The method in accordance with claim 1 wherein the fibers are provided as a web which includes alumina fibers.

4. The method in accordance with claim 1 wherein the fibers are provided as a web which includes alumina-boria-silica fibers.

5. The method in accordance with claim 1 wherein the fibers are provided as a web which includes silica fibers.

6. The method in accordance with claim 1 wherein the fibers are provided as a web which includes titanium boride fibers.

7. The method in accordance with claim 1 wherein the fibers are provided as a web which includes carbon fibers.

8. The method in accordance with claim 1 wherein the fibers are provided as a web which includes aluminum nitride fibers.

9. The method in accordance with claim 1 wherein the slurry contains alumina to boria in a mole ratio in the range of 2 to 8.

10. The method in accordance with claim 1 wherein the slurry contains about 9 moles of alumina and about 2 moles of boria.

11. The method in accordance with claim 1 wherein the slurry contains 40 to 70 vol. % solids including $Al_2O_3$ and $B_2O_3$.

12. The method in accordance with claim 1 wherein the ceramic matrix composite contains 20 to 60 vol. % fibers.

13. The method in accordance with claim 1 wherein the ceramic matrix composite contains 25 to 50 vol. % fibers.

14. The method in accordance with claim 1 wherein the ceramic matrix composite contains 28 to 35 vol. % fibers.

15. The method in accordance with claim 1 wherein the slurry contains a sintering aid.

16. The method in accordance with claim 15 wherein the sintering aid is selected from CaO, MgO and $CaAl_2B_2O_7$.

17. The method in accordance with claim 15 wherein the slurry contains up to 4% sintering aid.

18. The method in accordance with claim 1 wherein the matrix is $Al_{18}B_4O_{33}$.

19. The method in accordance with claim 1 wherein the body is a web.

20. The method in accordance with claim 1 wherein the organic binder is burned out.

21. The method in accordance with claim 1 wherein the sintering is performed in a temperature range of 800° to 1200° C.

22. A method of forming an improved ceramic matrix composite using the expansion effect resulting from formation of aluminum borate from alumina and boria comprising the steps of:
   (a) providing a slurry comprised of alumina and boria in the ratio of 9 moles of alumina to 2 moles of boria and an organic binder solution containing a monomer and a liquid solvent, the slurry comprising 40 to 70 vol. % alumina and boria, the remainder the organic binder solution, the alumina and boria capable of reacting to form $Al_{18}B_4O_{33}$;
   (b) introducing said slurry to a web of fibers selected from silicon carbide, alumina-boria and carbon fibers to provide an infiltrated web;
   (c) removing liquid solvent from said green composite;
   (d) removing said organic binder by heating; and
   (e) sintering said green composite at from 800° to 1300° C. to cause a reaction of alumina and boria to form a ceramic matrix composite comprised of said web of fibers and aluminum borate having the formula $Al_{18}B_4O_{33}$, the reaction providing up to a 14% volume expansion in the green composite which aids in filling pores resulting from the organic binder removal.

23. A method of forming an improved ceramic matrix composite using the expansion effect resulting from formation of aluminum borate from alumina and boria comprising the steps of:
   (a) providing a slurry comprised of alumina and boria in the ratio of 9 moles of alumina to 2 moles of boria and an organic binder solution containing a monomer and a liquid solvent, the slurry comprising 40 to 70 vol. % alumina and boria, the remainder the organic binder solution, the alumina and boria capable of reacting to form aluminum borate;

(b) introducing said slurry to a web of fibers selected from silicon carbide, alumina-boria and carbon fibers to provide an infiltrated web;
(c) removing liquid solvent from said green composite;
(d) removing said organic binder by heating; and
(e) sintering said green composite at from 800° to 1300° C. to cause a reaction of alumina and boria to form a ceramic matrix composite comprised of said web of fibers and aluminum borate having the formula $Al_xB_yO_z$ wherein x is equal to 16–20, y is equal to 3–5 and z is equal to 30–36, the composite containing 20 to 60 vol. % fiber, the remainder aluminum borate, the reaction causing a volume expansion in said green composite which effectively fills voids in said composite resulting from the organic binder removal.

* * * * *